United States Patent
Hou et al.

(10) Patent No.: US 8,054,872 B2
(45) Date of Patent: Nov. 8, 2011

(54) METHOD AND APPARATUS FOR SIGNAL CARRIER-TO-NOISE POWER DENSITY RATIO CALCULATION

(75) Inventors: Jianhui Hou, Chengdu (CN); Bo Yu, Chengdu (CN); Xiaoguang Yu, Wuhan (CN); Haiquan Huang, Chengdu (CN)

(73) Assignee: O2Micro, Inc., Santa Clara, CA (US)

(*) Notice: Subject to any disclaimer, the term of this patent is extended or adjusted under 35 U.S.C. 154(b) by 774 days.

(21) Appl. No.: 12/151,668

(22) Filed: May 8, 2008

(65) Prior Publication Data

US 2008/0317099 A1     Dec. 25, 2008

Related U.S. Application Data

(63) Continuation-in-part of application No. 11/820,807, filed on Jun. 21, 2007, now Pat. No. 7,869,485.

(51) Int. Cl.
*H04B 3/46* (2006.01)
*H04B 17/00* (2006.01)
*H04Q 1/20* (2006.01)

(52) U.S. Cl. ........ 375/227; 375/149; 375/150; 375/346; 375/343; 375/285; 370/252; 455/226.3

(58) Field of Classification Search .......... 375/343, 375/227, 228, 346, 285, 284, 149, 150; 370/252; 455/226.3

See application file for complete search history.

(56) References Cited

U.S. PATENT DOCUMENTS

| | | | |
|---|---|---|---|
| 4,785,463 A | 11/1988 | Janc et al. | |
| 5,223,843 A | 6/1993 | Hutchinson | |
| 5,963,582 A | 10/1999 | Stansell, Jr. | |
| 6,272,189 B1 | 8/2001 | Garin et al. | |
| 6,487,174 B1 * | 11/2002 | Mizuguchi et al. | 370/252 |
| 7,161,977 B1 | 1/2007 | Jung | |
| 7,395,155 B2 | 7/2008 | Hsu | |
| 7,613,258 B2 | 11/2009 | Yu et al. | |
| 2002/0015439 A1 | 2/2002 | Kohli et al. | |
| 2004/0071196 A1 | 4/2004 | Marsden et al. | |
| 2004/0141549 A1 | 7/2004 | Abraham et al. | |
| 2006/0022868 A1 | 2/2006 | Awata | |
| 2007/0076788 A1 | 4/2007 | Jia et al. | |
| 2007/0153880 A1 | 7/2007 | Cartmell | |
| 2007/0237269 A1 * | 10/2007 | Lillo et al. | 375/343 |

FOREIGN PATENT DOCUMENTS

| | | |
|---|---|---|
| CN | 2896304 Y | 5/2007 |
| EP | 0946013 A1 | 9/1999 |
| EP | 2007020 A2 | 12/2008 |
| JP | 7140224 A | 6/1995 |
| JP | 10013364 A | 1/1998 |
| JP | 2000165294 A | 6/2000 |
| JP | 2001313593 A | 11/2001 |
| JP | 2005253055 A | 9/2005 |
| WO | 0246789 A1 | 6/2002 |

OTHER PUBLICATIONS

English Translation of Office Action From Japan Patent Office for App No. 2007-267041 Mail Date: Mar. 29, 2011.

English Translation of Office Action From Japan Patent Office for App No. 2007-267041 Mail Date: Aug. 3, 2010.

* cited by examiner

*Primary Examiner* — Phuong Phu

(57) ABSTRACT

There is provided an apparatus for determining a carrier-to-noise power density ratio (CN0) of a spread spectrum signal. The apparatus includes a signal power calculation unit and a conversion unit. The signal power calculation unit determines a signal power indicator indicative of a signal to noise ratio of the spread spectrum signal. The conversion unit is coupled to the signal power calculation unit and stores a lookup table representing a relationship between the signal power indicator and the carrier-to-noise power density ratio. The conversion unit is operable for converting the signal power indicator to the carrier-to-noise power density ratio according to the lookup table.

25 Claims, 10 Drawing Sheets

| CN0(dB-Hz) | SIGNAL POWER INDICATOR | CN0(dB-Hz) | SIGNAL POWER INDICATOR | CN0(dB-Hz) | SIGNAL POWER INDICATOR |
|---|---|---|---|---|---|
| 13 | 1.371527509 | 28 | 8.343163701 | 43 | 19.09305712 |
| 14 | 1.4684444 | 29 | 9.4063302488 | 44 | 19.27204026 |
| 15 | 1.574257186 | 30 | 10.50980768 | 45 | 19.41696595 |
| 16 | 1.733681099 | 31 | 11.567555088 | 46 | 19.53526379 |
| 17 | 1.902666835 | 32 | 12.65863577 | 47 | 19.62786972 |
| 18 | 2.111708833 | 33 | 13.65984233 | 48 | 19.7030153 |
| 19 | 2.399829682 | 34 | 14.58030038 | 49 | 19.7635915 |
| 20 | 2.723966216 | 35 | 15.447080885 | 50 | 19.81207824 |
| 21 | 3.123199084 | 36 | 16.18644682 | 51 | 19.84992233 |
| 22 | 3.555342386 | 37 | 16.83694938 | 52 | 19.88074911 |
| 23 | 4.1619595340 | 38 | 17.4041993 | 53 | 19.90517131 |
| 24 | 4.8202106820 | 39 | 17.88248652 | 54 | 19.92459583 |
| 25 | 5.582387879 | 40 | 18.271237552 | 55 | 19.94015039 |
| 26 | 6.395273775 | 41 | 18.60062281 | 56 | 19.95251934 |
| 27 | 7.348045942 | 42 | 18.87181277 | 57 | 19.96211208 |

METHOD AND APPARATUS FOR SIGNAL CARRIER-TO-NOISE POWER DENSITY RATIO CALCULATION

RELATED APPLICATIONS

This application is a continuation-in-part of the U.S. application Ser. No. 11/820,807, filed on Jun. 21, 2007, now U.S. Pat. No. 7,869,485 which is hereby incorporated by reference in its entirety.

TECHNICAL FIELD

The invention relates to spread spectrum signal processing, and more particularly, to determining a carrier-to-noise power density ratio (CN0) of a spread spectrum signal, e.g., a GPS signal.

BACKGROUND

Generally, a GPS (global position system) receiver acquires GPS signals from a set of satellites and then tracks these GPS signals. During the acquisition stage, the initial carrier frequency of a carrier signal and initial phase of a pseudorandom noise (PRN) code associated with a received GPS signal are identified. These two parameters are then used for tracking the GPS signal.

Due to the motion of the satellites and the receiver, Doppler effects may occur and the carrier frequency and PRN code may vary over time. To overcome Doppler effects and maintain the availability of GPS signals, a tracking process is performed based on the initial carrier frequency and initial PRN code which are acquired during the acquisition stage.

When the variations of the carrier frequency and PRN code are successfully tracked by the receiver, the GPS signal can be referred to as "locked" by the receiver. When the receiver fails to track the variations of the carrier frequency and PRN code, the GPS signal from a corresponding satellite can be referred to as "lost". When a signal is lost, it may not be used by the receiver for further processing such as calculating the position of the receiver. The receiver may need to perform acquisition again to ensure that there is enough number of GPS signals acquired and locked for further processing.

When the GPS signal is received by the receiver, bit boundaries of the navigation data stream can be identified after the carrier signal and PRN code have been stripped off from the received GPS signal. The navigation data stream is formed by a sequence of navigation data bits. The lasting time of each data bit can be 20 ms. The end of a data bit, which is also the beginning of another data bit, can be referred to as a boundary of a navigation data bit (also called bit boundary).

Conventionally, in a GPS receiver, a bit synchronization method is employed to determine if the GPS signal is locked or lost. More specifically, the bit synchronization module is needed to identify the bit boundaries of navigation data stream after the carrier signal and PRN code have been stripped off from the received GPS signal. According to such conventional bit synchronization method, the lock status of the GPS signal is detected at the same time when the bit boundaries of navigation data stream are determined. If the bit boundaries can not be determined after repeating the search process for a predetermined times, the signal is regarded as lost.

There are some drawbacks of this conventional method. First, the bit synchronization module may be difficult to determine the bit boundaries and the lock status if there are no data transitions within a relatively long bit sequence. In other words, this method may not be efficient when there are relatively long sequences of "0" or "1" in the navigation data stream. Second, this conventional method can be time-consuming. Third, the bit synchronization process may need to be performed from time to time in order to detect the lock status even after the GPS signal is acquired.

GPS signal power can indicate the quality of GPS signals. The carrier-to-noise power density ratio (CN0) in GPS receivers is defined as a ratio of the modulated carrier power to the noise power in a 1 Hz bandwidth. In decibels, carrier-to-noise power density ratio is expressed in dB-Hz. A greater carrier-to-noise power density ratio can indicate a higher signal quality. Carrier-to-noise power density ratio is a parameter in analyzing GPS receiver performance and may directly affect the precision of the receiver's pseudo range and carrier phase observations.

A traditional method to determine a carrier-to-noise power density ratio involves receiving a GPS signal, generating a noise signal and then calculating the signal power and the noise power to obtain the carrier-to-noise power density ratio. The traditional method may require extra hardware resources to calculate the noise power.

SUMMARY

According to one embodiment of the invention, there is provided an apparatus for determining a carrier-to-noise power density ratio (CN0) of a spread spectrum signal. The apparatus includes a signal power calculation unit and a conversion unit. The signal power calculation unit determines a signal power indicator indicative of a signal to noise ratio of the spread spectrum signal. The conversion unit is coupled to the signal power calculation unit and stores a lookup table representing a relationship between the signal power indicator and the carrier-to-noise power density ratio. The conversion unit is operable for converting the signal power indicator to the carrier-to-noise power density ratio according to the lookup table.

BRIEF DESCRIPTION OF THE DRAWINGS

Features and advantages of embodiments of the invention will become apparent as the following detailed description proceeds, and upon reference to the drawings, where like numerals depict like elements, and in which:

FIG. 8 is a lookup table which is acquired by simulation and illustrates the relationship between the carrier-to-noise power density ratio and the signal power indicator of a spread spectrum signal, according to one embodiment of the present invention.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
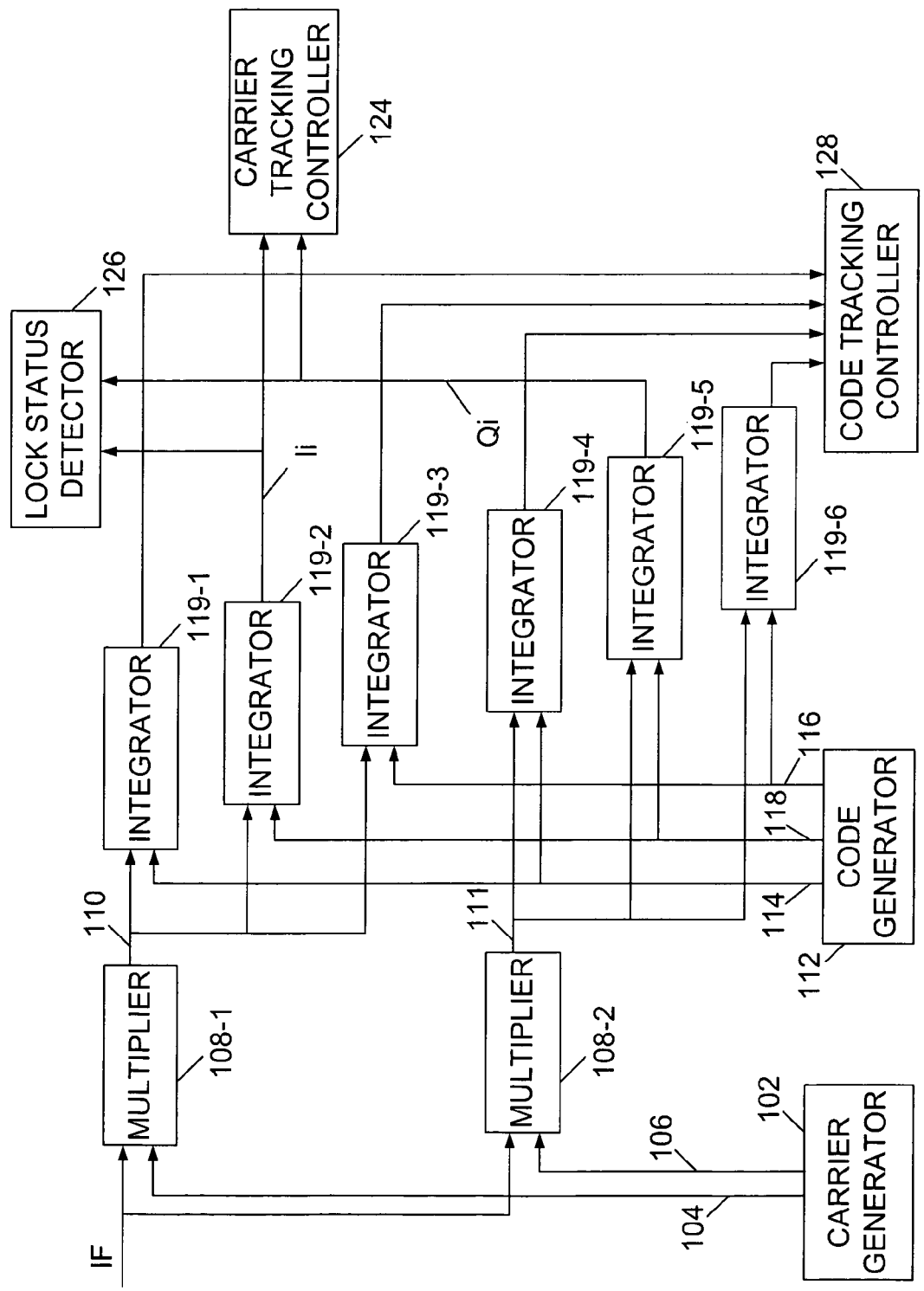
FIG. 1 illustrates an exemplary architecture for determining a lock status of a spread spectrum signal according to one embodiment of the present invention.

FIG. 1 illustrates an exemplary architecture for determining a lock status of a spread spectrum signal, e.g., a GPS (global position system) signal, in one embodiment. In one embodiment, a stream of the navigation data bits is first modulated by a PRN (pseudo random noise) code PRN0, e.g., a Coarse Acquisition code (C/A code), and then modulated by a carrier signal Cm so as to generate a GPS signal. The received GPS signal can be first converted to a signal with a desired output frequency and then digitized at a predetermined sampling rate. The converted and digitized signal is an IF (intermediate frequency) signal. The IF signal is first multiplied with two orthogonal carrier signals 104 and 106 which are generated by a carrier generator 102, and then integrated with three PRN codes 114, 116, and 118 which are generated by a code generator 112, in one embodiment. In one embodiment, carrier signals 104 and 106 have the same frequency as the aforementioned modulated carrier signal Cm. A lock status detector 126 detects a lock status of the GPS signal. A carrier tracking controller 124 controls the carrier generator 102 to generate the two orthogonal carrier signals 104 and 106. A code tracking controller 128 controls the code generator 112 to generate the three PRN codes 114, 116, and 118.

In operation, the carrier generator 102 can generate two orthogonal carrier signals shown as an in-phase carrier signal 104 and a quadrature carrier signal 106. The IF signal is multiplied with these two orthogonal carrier signals 104 and 106 by the multiplier 108-1 and the multiplier 108-2 to generate a first data stream 110 and a second data stream 111, respectively. The code generator 112 can generate three PRN codes: an early code 114, a late code 116, and a prompt code 118. In one embodiment, the prompt code 118 is the same as the aforementioned modulated PRN code PRN0. The prompt code 118 has the same phase shift as the first data stream 110 and the second data stream 111, in one embodiment. The early code 114 and the late code 116 are both derived from the prompt code 118 time-shifted by an approximately one-half-chip time period, in one embodiment. The initial frequency of the in-phase carrier signal 104 and the quadrature carrier signal 106, as well as the prompt code 118, can be determined by an acquisition module 902 (shown in FIG. 9).

The early code 114, late code 116, and prompt code 118 are integrated with the first data stream 110 and the second data stream 111 respectively in a set of integrators, which are numbered consecutively from the integrator 119-1 to the integrator 119-6, to generate six integration results. Integration herein refers to an operation of multiplying one of the data stream with one of the PRN code point by point and sum up the products over a time period. In one embodiment, the time period of the integration is 1 ms, which is equal to a period of the PRN code. The in-phase integration result based on the prompt code 118 and the first data stream 110 is referred to as a first integration result 'Ii' (i=1, 2, . . . X). The quadrature integration result based on the prompt code 118 and the second data stream 111 is referred to as a second integration result 'Qi' (i=1, 2, . . . X).

The first integration result 'Ii' and the second integration result 'Qi' are applied to the carrier tracking controller 124 which controls the carrier generator 102 to generate the two orthogonal carrier signals 104 and 106. 'Ii' and 'Qi' are also applied to the lock status detector 126 to detect the lock status of the GPS signal. The rest four integration results are applied to the code tracking controller 128 which controls the code generator 112 to generate the early, late and prompt codes 114, 116, and 118. The carrier tracking controller 124 may use a first phase-locked loop (carrier loop) to track the carrier frequency by using an oscillator to control the frequency of carrier signals 104 and 106, such that the frequency of carrier signals 104 and 106 follows the carrier frequency of the aforementioned modulated carrier signal Cm. The code tracking controller 128 may use a second phase-locked loop (code loop) to track the PRN code by adjusting the rate of the prompt code 118, such that the rate of prompt code 118 follows the rate of the aforementioned modulated PRN code PRN0.

Figure 2:
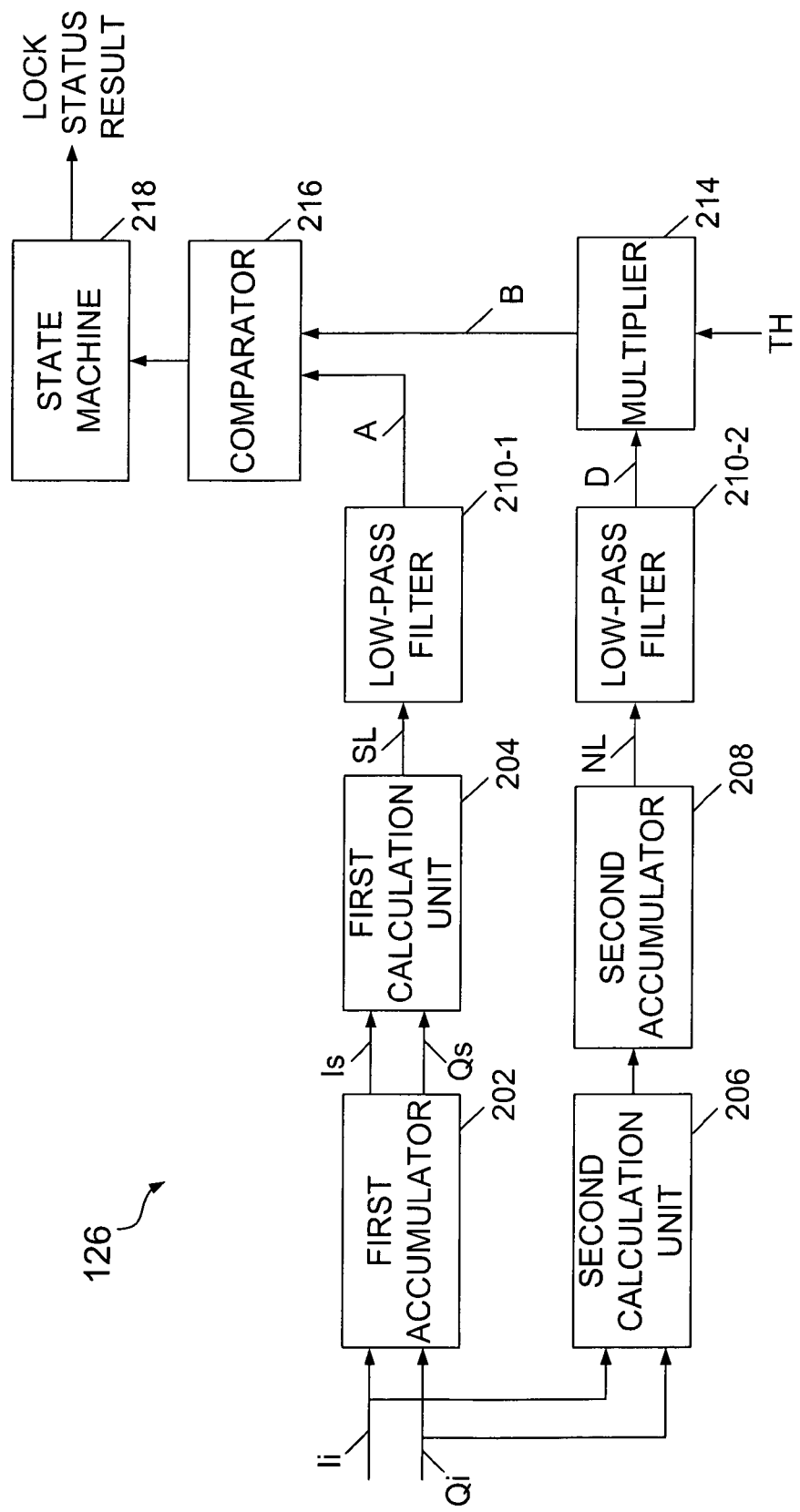
FIG. 2 illustrates an exemplary architecture of the lock status detector shown in FIG. 1 according to one embodiment of the present invention.

FIG. 2 illustrates an exemplary architecture of the lock status detector 126 shown in FIG. 1, in one embodiment. The lock status detector 126 includes a first accumulator 202, a first calculation unit 204, a second calculation unit 206, a second accumulator 208, a low-pass filter (LPF) 210-1, a LPF 210-2, a multiplier 214, a comparator 216, and a state machine 218, in one embodiment. The first integration result 'Ii' and the second integration result 'Qi' are respectively transferred through two paths: an S channel including the first accumulator 202, the first calculation unit 204 and the LPF 210-1, and an N channel including the second calculation unit 206, the second accumulator 208 and the LPF 210-2.

In the S channel, 'Ii' and 'Qi' are sent to the first accumulator 202 where 'Ii' and 'Qi' are accumulated over a time period to produce a first accumulated result 'Is' and a second accumulated result 'Qs', respectively. In one embodiment, the first accumulated result 'Is' is generated by summing up all the first integration result 'Ii' which are generated from a navigation data bit and the second accumulated results 'Qs' is generated by summing up all the second integration result 'Qi' which are generated from the same navigation data bit. In one embodiment, a bit synchronization module 906 (shown in FIG. 9) can be employed to determine the boundaries of the navigation data bit to ensure that 'Is' and 'Qs' can be generated from a complete navigation data bit. In one embodiment, each 'Ii' and each 'Qi' are the integration results of 1 ms time period. The time period of one navigation data bit is 20 ms, in one embodiment. Accordingly, 'Is' and 'Qs' are the accumulated results of 20 'Ii' and 20 'Qi' respectively, in one embodiment.

According to one embodiment of the present invention, the lock status detector 126, rather than the bit synchronization module 906 (shown in FIG. 9), detects whether a GPS signal is locked or lost. Therefore, even if there are relatively long sequences of "0" or "1" in the navigation data stream, the lock status detector 126 may still detect the lock status of the GPS signal. Furthermore, according to the present invention, bit synchronization only needs to be performed once after acquisition of the GPS signal compared with the conventional way using bit synchronization module to detect the lock status of the GPS signal from time to time, in one embodiment.

After a pair of 'Is' and 'Qs' is generated by the first accumulator 202, a first calculation unit 204 determines a first evaluation value SL based on 'Is' and 'Qs'.

In the N channel, 'Ii' and 'Qi' are processed in a second calculation unit 206. The processed results are then accumulated in a second accumulator 208 by summing up multiple processed results in a predetermined time period. The predetermined time period can be multiple of 1 ms. In one embodiment, the predetermined time period is 20 ms which is consistent with the time used to produce 'Is' and 'Qs' in the S channel. The output of the second accumulator 208 is a second evaluation value NL.

The processing of 'Is' and 'Qs' in the first calculation unit 204 and the processing of 'Ii' and 'Qi' in the second calculation unit 206 will be described in detail below. In one embodiment of the invention, in the S channel, the first calculation unit 204 calculates the sum of squares of 'Is' and 'Qs'. In the N channel, the second calculation unit 206 calculates the sum of squares of 'Ii' and 'Qi'. Such embodiment can be expressed as the following equation.

$$\begin{cases} SL = \left(\sum_{i=1}^{M} I_i\right)^2 + \left(\sum_{i=1}^{M} Q_i\right)^2 \\ NL = \sum_{i=1}^{M} (I_i^2 + Q_i^2) \end{cases} \quad (1)$$

In equation (1), 'Ii' is the first integration result from the integrator 119-2. 'Qi' is the second integration result from the integrator 119-5.

$$\sum_{i=1}^{M} I_i$$

represents the first accumulated result 'Is' from the first accumulator 202.

$$\sum_{i=1}^{M} Q_i$$

represents the second accumulated result 'Qs' from the first accumulator 202. SL is the first evaluation value from the first calculation unit 204. NL is the second evaluation value from the second accumulator 208.

In another embodiment, in the S channel, the first calculation unit 204 calculates the sum of squares of 'Is' and 'Qs' and then calculates the square root of the sum of squares. In the N channel, the second calculation unit 206 calculates the sum of squares of 'Ii' and 'Qi' and then calculates the square root of the sum of squares. Such embodiment can be expressed as the following equation.

$$\begin{cases} SL = \sqrt{\left(\sum_{i=1}^{M} I_i\right)^2 + \left(\sum_{i=1}^{M} Q_i\right)^2} \\ NL = \sum_{i=1}^{M} \left(\sqrt{I_i^2 + Q_i^2}\right) \end{cases} \quad (2)$$

In equation (2), 'Ii' is the first integration result from the integrator 119-2. 'Qi' is the second integration result from the integrator 119-5.

$$\sum_{i=1}^{M} I_i$$

represents the first accumulated result 'Is' from the first accumulator 202.

$$\sum_{i=1}^{M} Q_i$$

represents the second accumulated result 'Qs' from the first accumulator 202. SL is the first evaluation value from the first calculation unit 204. NL is the second evaluation value from the second accumulator 208.

In yet another embodiment, in the S channel, the first calculation unit 204 calculates the sum of absolute values of 'Is' and 'Qs'. In the N channel, the second calculation unit 206 calculates the sum of absolute values of 'Ii' and 'Qi'. Such embodiment is expressed as the following equation.

$$\begin{cases} SL = \left|\sum_{i=1}^{M} I_i\right| + \left|\sum_{i=1}^{M} Q_i\right| \\ NL = \sum_{i=1}^{M} (|I_i| + |Q_i|) \end{cases} \quad (3)$$

In equation (3), 'Ii' is the first integration result from the integrator 119-2. 'Qi' is the second integration result from the integrator 119-5.

$$\sum_{i=1}^{M} I_i$$

represents the first accumulated result 'Is' from the first accumulator 202.

$$\sum_{i=1}^{M} Q_i$$

represents the second accumulated result 'Qs' from the first accumulator 202. SL is the first evaluation value from the first calculation unit 204. NL is the second evaluation value from the second accumulator 208.

The first evaluation value SL and the second evaluation value NL are passed through the LPF 210-1 and the LPF 210-2 respectively to obtain smoother filtered results. In one embodiment, the LPF 210-1 and/or the LPF 210-2 can be a first order infinite impulse response filter (IIR filter). The filtered result of the first evaluation value SL is referred to as A and the filtered result of the second evaluation value NL is referred to as D. The ratio of A to D is compared with a threshold value TH to generate a lock status result, in one embodiment. In one embodiment, D is first multiplied with TH at multiplier 214 to obtain a product which is referred to as B, and then A is compared with B at comparator 216 to generate a comparison result which is an indicator of the lock status of the GPS signal. If A is greater than B, it is suggested that the GPS signal may be locked. If B is greater than A, it is suggested that the GPS signal may be lost. To determine the lock status more accurately, a state machine 218 can be provided to make a determination, in one embodiment.

Figure 3:
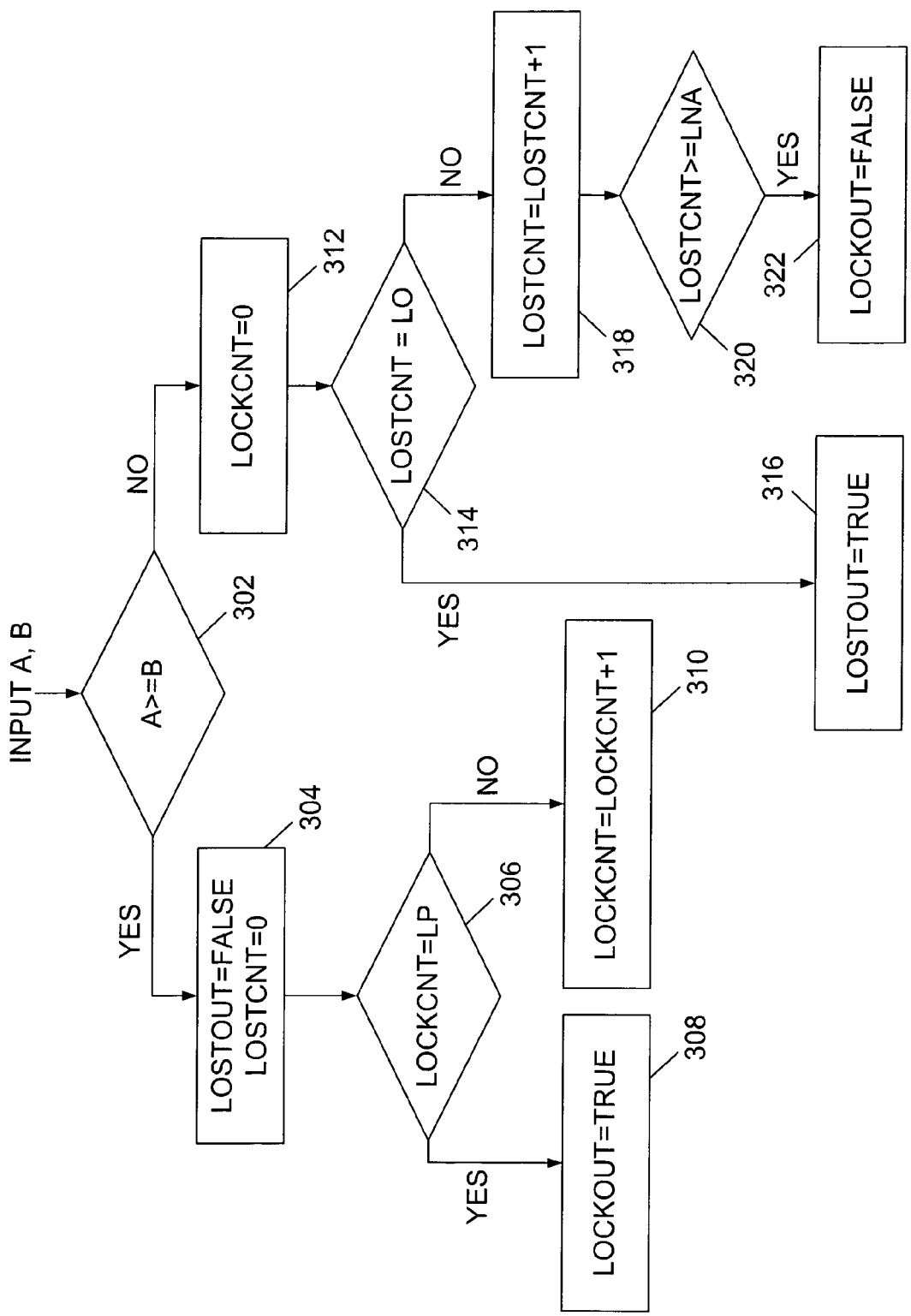
FIG. 3 illustrates an exemplary flowchart of a state machine in the lock status detector, according to one embodiment of the present invention.

FIG. 3 illustrates an exemplary flowchart of one embodiment of the state machine 218 used to determine if the GPS signal is locked or lost based on A and B. There are some parameters of the state machine 218 including LOCKCNT, LOSTCNT, LP, LNA, and LO. The outputs of the state machine 218 include a LOCKOUT signal and a LOSTOUT signal. LOCKOUT and LOSTOUT have values of either "TRUE" or "FALSE". When the state machine 218 begins to operate, both LOCKOUT and LOSTOUT are initially set to "FALSE" and both LOCKCNT and LOSTCNT are initially set to 0, in one embodiment. Each one of LP, LNA and LO is set to a predetermined integer respectively. LO is greater than LNA, in one embodiment. LP, LNA and LO are determined by system requirements such as detection probability, false alarm probability and the time needed to generate a lock status result.

The state machine 218 receives a pair of A and B and makes a comparison, in step 302. If A is greater than B or if A is equal to B, LOSTOUT is set to FALSE and LOSTCNT is set to 0, in step 304. Then, the state machine 218 checks the value of LOCKCNT, in step 306. If LOCKCNT is equal to LP, LOCKOUT is set to TRUE, in step 308. Otherwise LOCKCNT is increased by 1, in step 310.

If A is smaller than B, then LOCKCNT is set to 0, in step 312. Then the state machine 218 checks the value of LOSTCNT, in step 314. If LOSTCNT is equal to LO, then LOSTOUT is set to TRUE, in step 316. Otherwise LOSTCNT is increased by 1, in step 318. Then the value of LOSTCNT is compared with LNA, in step 320. If LOSTCNT is greater than LNA or LOSTCNT is equal to LNA, then LOCKOUT is set to FALSE, in step 322.

The lock status is determined by the value of LOCKOUT and LOSTOUT, in one embodiment. If LOSTOUT is FALSE and LOCKOUT is TRUE, a status of "locked" can be detected and the receiver will further process the information obtained from the GPS signal.

If LOSTOUT is TRUE and LOCKOUT is FALSE, a status of "lost" can be detected. The receiver may stop further processing the GPS signal and may need to perform the acquisition process again.

If LOSTOUT is FALSE and LOCKOUT is FALSE, a status of "pre-lost" can be detected. The status of "pre-lost" means that the GPS signal is not locked but may become locked through tracking process. Under this condition, the GPS signal is held and not used for further processing, but re-acquisition is not performed, in one embodiment. The state machine 218 continues running until LOSTCNT is equal to LO to determine a status of "lost", or until LOCKCNT is equal to LP to determine a status of "locked".

In one embodiment of the invention, the state machine 218 can be updated each time when a pair of 'Is' and 'Qs' is produced. To reduce the workload, in another embodiment of the invention, the state machine 218 is updated each time when a predetermined number of 'Is' and 'Qs' have been produced.

By using the state machine 218, detection probability can be increased and false alarm probability can be decreased because the final result can be based on the signal status which is obtained from a sequence of navigation data bits rather than from only one navigation data bit. Occasional incidental or error can have little effect on the final result.

Figure 4:
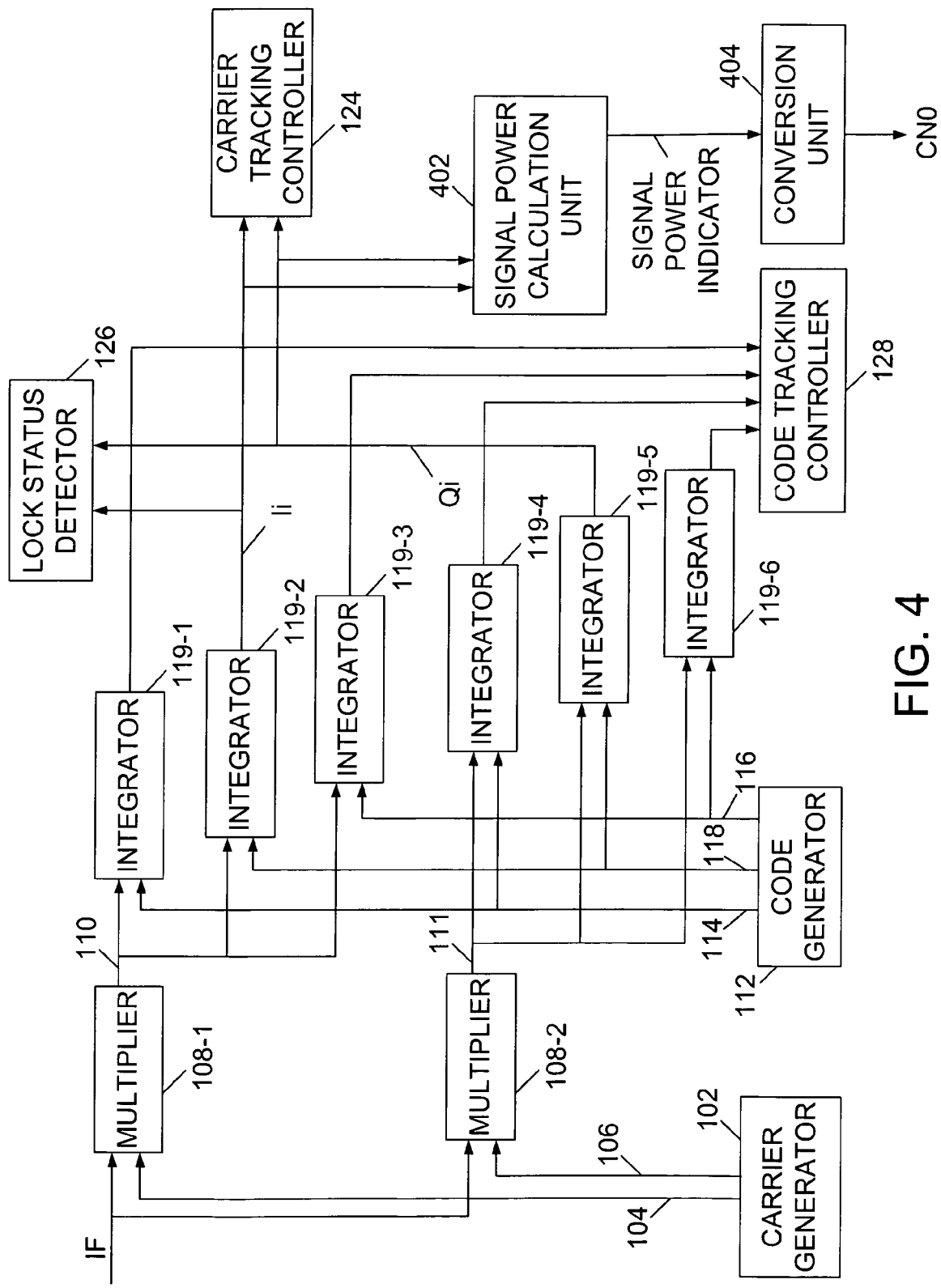
FIG. 4 illustrates an exemplary architecture for calculating a carrier-to-noise power density ratio of a spread spectrum signal according to one embodiment of the present invention.

FIG. 4 illustrates an exemplary architecture for calculating a carrier-to-noise power density ratio CN0 of a spread spectrum signal, e.g., a GPS signal, and determining a lock status of the spread spectrum signal according to one embodiment of the present invention. Elements labeled the same as in FIG. 1 have similar functions and will not be repetitively described herein for purposes of brevity and clarity. As shown in FIG. 4, a signal power calculation unit 402 determines a signal power indicator indicative of a signal to noise ratio of the spread spectrum signal. A conversion unit 404 coupled to the signal power calculation unit 402 stores a lookup table (not shown in FIG. 4 for purposes of brevity and clarity) representing a relationship between the signal power indicator and the carrier-to-noise power density ratio CN0, and converts the signal power indicator to the carrier-to-noise power density ratio CN0 according to the lookup table stored in the conversion unit 404. In one embodiment, the carrier-to-noise power density ratio CN0 is a ratio of the modulated carrier power (power of the modulated carrier signal Cm) to the noise power in a 1 Hz bandwidth.

In the example of FIG. 4, the first integration result 'Ii' and the second integration result 'Qi' are sent to the signal power calculation unit 402 to calculate a signal power indicator which is determined by the power of the spread spectrum signal and the power of the noise. The signal power indicator can be converted to a carrier-to-noise power density ratio CN0 of the spread spectrum signal in the conversion unit 404. The conversion unit 404 can convert the signal power indicator to the carrier-to-noise power density ratio CN0 according to a lookup table (not shown in FIG. 4 for purposes of brevity and clarity), which is obtained by simulation. A set of predetermined carrier-to-noise power density ratios corresponding to a set of predetermined signal power indicators are stored in the lookup table in advance. The conversion unit 404 will be discussed in detail with relation to FIG. 6, FIG. 7 and FIG. 8.

Figure 5:
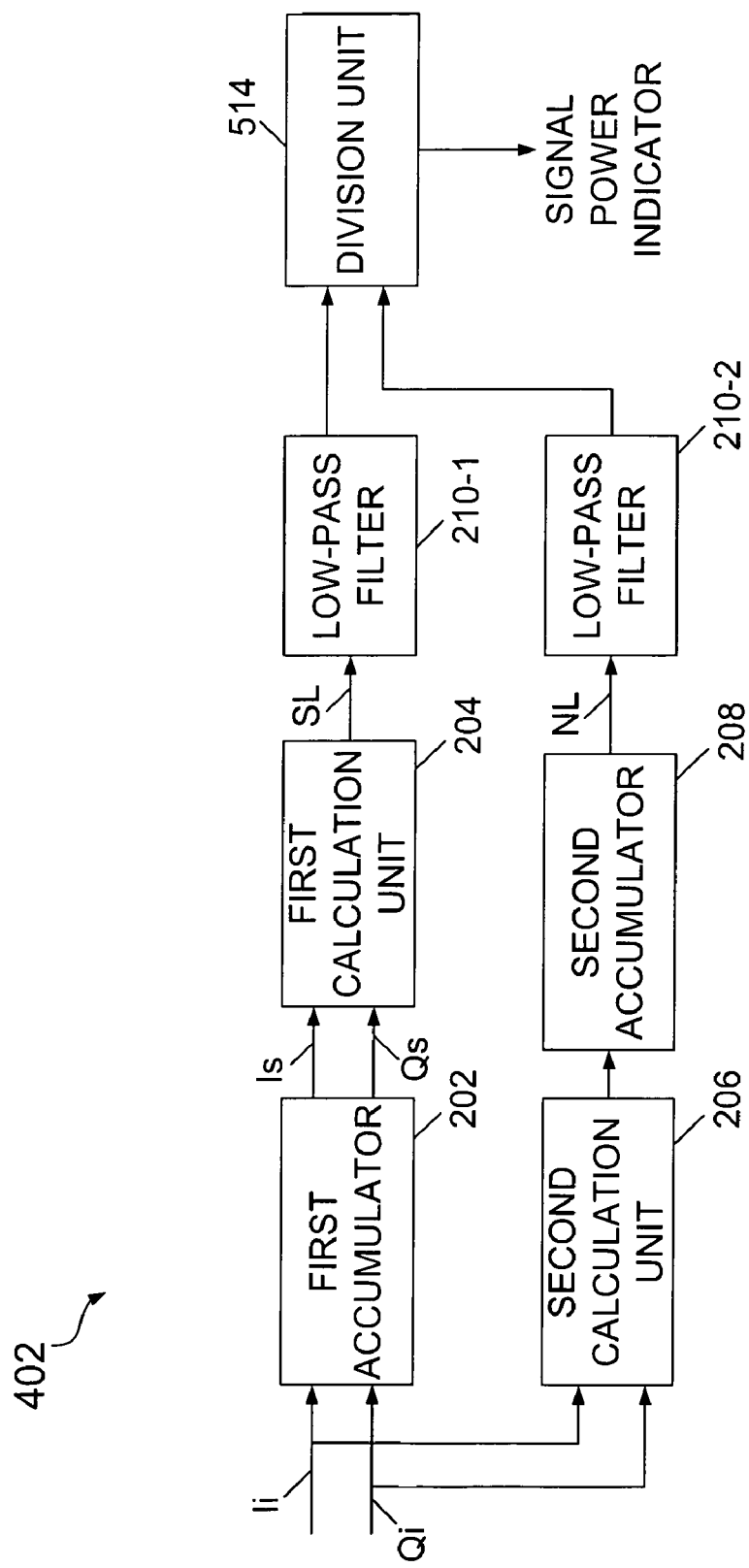
FIG. 5 illustrates an exemplary architecture of the signal power calculation unit shown in FIG. 4, according to one embodiment of the present invention.

FIG. 5 illustrates an exemplary architecture of the signal power calculation unit 402 shown in FIG. 4, in accordance with one embodiment of the present invention. Elements labeled the same as in FIG. 2 have similar functions and will not be repetitively described herein for purposes of brevity and clarity.

In one embodiment, the signal power calculation unit 402 includes a first accumulator 202 for accumulating an in-phase integration result (also referred to as the first integration result) 'Ii' and a quadrature integration result (also referred to as the second integration result) 'Qi' separately over a time period, a first calculation unit 204 coupled to the first accumulator 202 for determining a first evaluation value SL based on the accumulated in-phase integration result 'Is' and the accumulated quadrature integration result 'Qs', a second calculation unit 206 for processing the in-phase integration result 'Ii' and the quadrature integration result 'Qi', a second accumulator 208 coupled to the second calculation unit 206 for determining a second evaluation value NL by accumulating an output of the second calculation unit 206 over the time period, a low-pass filter (LPF) 210-1, a LPF 210-2, and a division unit 514 for determining a signal power indicator based on the first and second evaluation results SL and NL.

The first integration result 'Ii' and the second integration result 'Qi' are respectively transferred through two paths: an S channel including the first accumulator 202, the first calculation unit 204 and the LPF 210-1, and an N channel including the second calculation unit 206, the second accumulator 208 and the LPF 210-2.

In the S channel, 'Ii' and 'Qi' are processed by the first accumulator 202 and the first calculation unit 204 to determine a first evaluation value SL. In the N channel, 'Ii' and 'Qi' are processed by the second calculation unit 206 and the second accumulator 208 to determine a second evaluation value NL. The process to determine the first evaluation value SL and the second evaluation value NL is similar to the process which is described with FIG. 2 and thus will not be repetitively described herein for purposes of brevity and clarity.

The first evaluation value SL and the second evaluation value NL are passed through the low-pass filter (LPF) 210-1 and the LPF 210-2 respectively to obtain smoother filtered results. In one embodiment, the LPF 210-1 and/or the LPF 210-2 can be a first order infinite impulse response filter (IIR filter). The filtered SL is divided by the filtered NL in the division unit 514 to produce a ratio which is the signal power indicator, in one embodiment. Referring to FIG. 4, the signal power indicator is forwarded to the conversion unit 404 to determine the carrier-to-noise power density ratio CN0.

Figure 6:
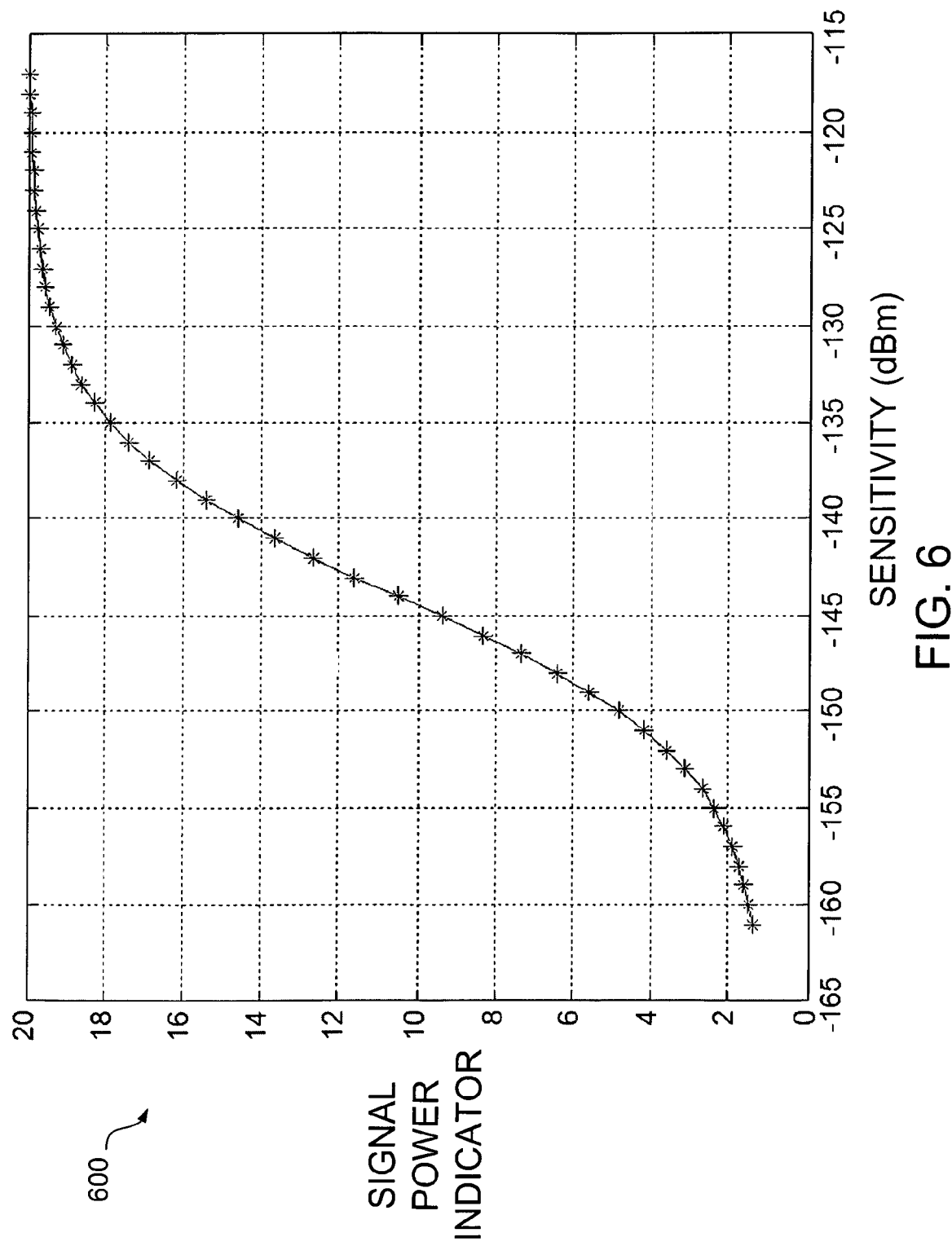
FIG. 6 is an exemplary simulation plot illustrating the relationship between a signal power indicator and a sensitivity of a spread spectrum signal according to one embodiment of the present invention.

FIG. 6 shows an exemplary simulation plot 600 which illustrates the relationship between the signal power indicator and the sensitivity of the spread spectrum signal based on equation (1). The horizontal axis represents the value of sensitivity of the spread spectrum signal in dBm, and the vertical axis represents the value of signal power indicator.

The curve 600 can be obtained by the computer simulation. In one embodiment, for a spread spectrum signal with certain signal strength, a carrier-to-noise power density ratio CN0 of the spread spectrum signal is first calculated according to a computer simulation of an exemplary architecture illustrated in FIG. 7, which will be discussed in detail in the following description. Then a signal power indicator of the spread spectrum signal is calculated according to a computer simulation of the architecture in FIG. 5. The sensitivity of the spread spectrum signal can be obtained based on the carrier-to-noise power density ratio CN0, according to equation (4).

$$\text{Sensitivity} = CN0 - 174 (\text{dBm}) \quad (4)$$

As a result, the curve 600 can be obtained according to the simulation results of the sensitivity and the carrier-to-noise power density ratio CN0 of the spread spectrum signal.

Figure 7:
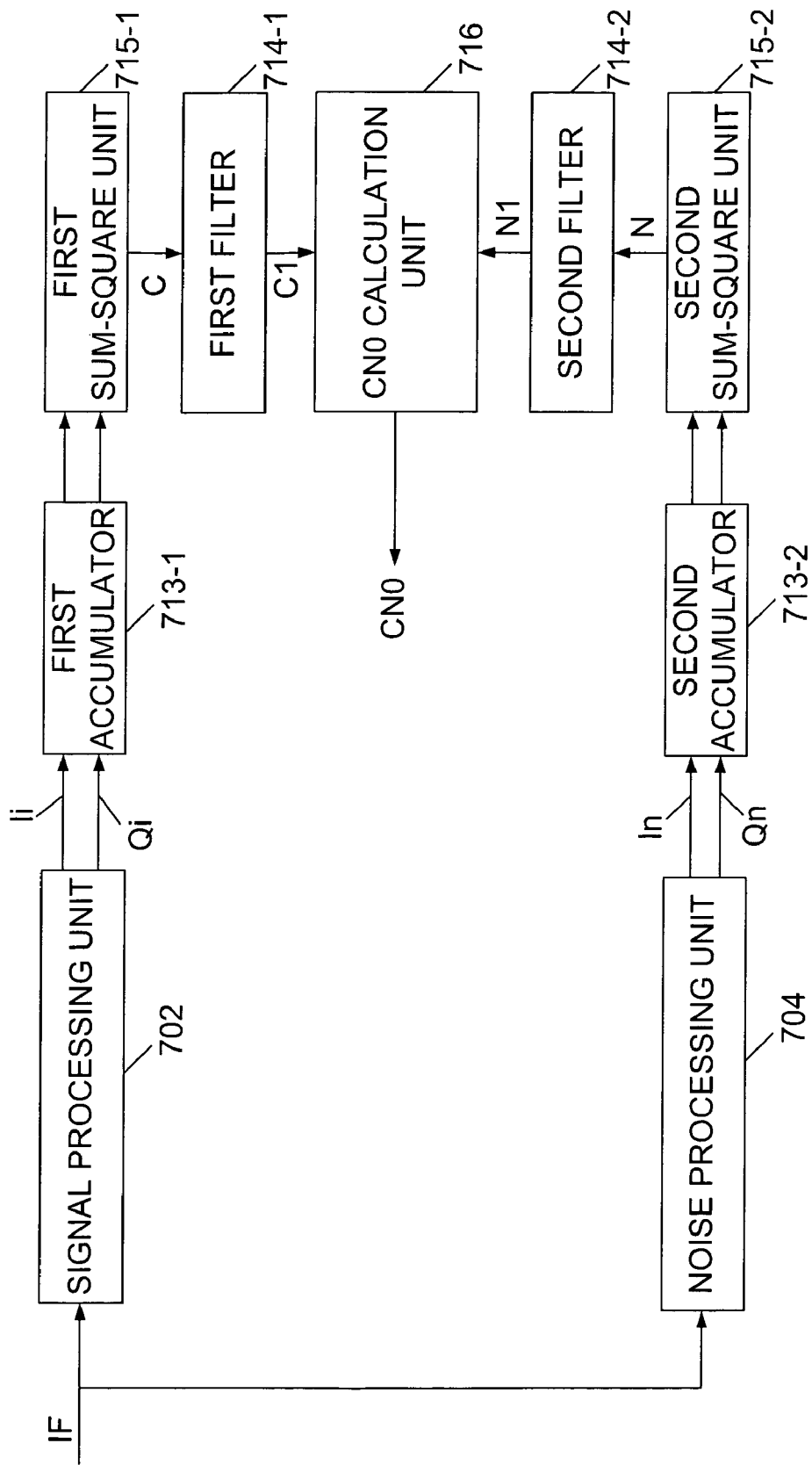
FIG. 7 illustrates an exemplary architecture for calculating a carrier-to-noise power density ratio of a spread spectrum signal during simulation according to one embodiment of the present invention.

FIG. 7 illustrates an exemplary architecture for calculating a carrier-to-noise power density ratio CN0 of a spread spectrum signal (e.g., a GPS signal) during simulation, in one embodiment. An IF signal is processed by a signal processing unit 702 and by a noise processing unit 704, respectively. At the signal processing unit 702, the IF signal is demodulated by stripping off the carrier signal and PRN code, and is integrated within a time period (e.g., 1 ms) to generate an in-phase integration result 'Ii' and a quadrature integration result 'Qi', respectively, in one embodiment.

'Ii' and 'Qi' are applied to a first accumulator 713-1 in which 'Ii' and 'Qi' are accumulated over a time period of K, to produce a first and second accumulated results respectively. At a first sum-square unit 715-1, the sum of squares of the first and second accumulated results is calculated, which is shown as 'C'. The value of 'C' can indicate the power of the signal.

At the noise processing unit 704, the IF signal is processed to provide a noise signal. The noise signal is integrated for a time period (e.g., 1 ms) to generate an in-phase integration result 'In' and a quadrature integration result 'Qn', respectively.

'In' and 'Qn' are accumulated respectively by the second accumulator 713-2 over the time period of K, to produce a third and fourth accumulated results. At the second sum-square unit 715-2, the sum of squares of the third and fourth accumulated results is calculated, which is shown as 'N'. The value of 'N' can indicate the noise power.

The first accumulator 713-1 produces the first and second accumulated results based on all the 'Ii' and 'Qi' which are generated from a complete navigation data bit. In one embodiment, the time period of K, during which the first accumulator 713-1 and the second accumulator 713-2 produce the first, second, third and fourth accumulated results, can be 20 ms, which is the period of a navigation data bit. The process to generate 'C' and 'N' can be shown as equation (5).

$$\begin{cases} C = \left(\sum_{i=1}^{K} I_i\right)^2 + \left(\sum_{i=1}^{K} Q_i\right)^2 \\ N = \left(\sum_{i=1}^{K} I_n\right)^2 + \left(\sum_{i=1}^{K} Q_n\right)^2 \end{cases} \quad (5)$$

The signal power 'C' and the noise power 'N' are passed through the first filter 714-1 and the second filter 714-2 respectively to obtain smoother filtered results, which are shown as 'C1' and 'N1' respectively. In a CN0 calculation unit 716, a carrier-to-noise power density ratio CN0 is determined based on 'C1' and 'N1' according to equation (6).

$$CN0 = [10*\lg 10(C1/N1-1) + 10*\lg K] \text{dB-Hz} \quad (6)$$

Furthermore, according to equation (4), a corresponding sensitivity of the spread spectrum signal can be determined based on the carrier-to-noise power density ratio CN0. The value of the sensitivity of the spread spectrum signal determines a position on the horizontal axis of the exemplary plot in FIG. 6. According to the present invention, a signal power indicator of the same spread spectrum signal can be determined through a simulation of the equation (1), based on the architecture shown in FIG. 4 and FIG. 5. The value of the signal power indicator determines a position on the vertical axis of the exemplary plot in FIG. 6. Therefore, the signal power indicator and the sensitivity can determine a corresponding point on the curve 600 in FIG. 6. By repeating this process many times with spread spectrum signals with different strengths, the exemplary curve 600 can be obtained, which contains experiential information about the relationship between the sensitivity and the signal power indicator of the spread spectrum signal.

The plot 600 in the example of FIG. 6 is obtained based on equation (1). However, the plot showing the relationship between the signal power indicator and the sensitivity of the spread spectrum signal can also be obtained based on equation (2), equation (3), or the like.

FIG. 8 provides an exemplary lookup table 800 which is acquired by simulation and illustrates the relationship between the carrier-to-noise power density ratio CN0 and signal power indicator based on equation (1). The lookup table 800 includes a set of predetermined signal power indicators (e.g., 1.371527509, 1.4684444, etc. as shown in FIG. 8) and a set of predetermined carrier-to-noise power density ratios CN0 (e.g., 13 dB-Hz, 14 dB-Hz, etc. as shown in FIG. 8), in one embodiment. Each predetermined signal power indicator corresponds to a corresponding predetermined carrier-to-noise power density ratio CN0 (e.g., the predetermined signal power indicator 1.371527509 corresponds to the predetermined CN0 13 dB-Hz), and each predetermined carrier-to-noise power density ratio CN0 also corresponds to a corresponding predetermined signal power indicator (e.g., the predetermined CN0 14 dB-Hz corresponds to the predetermined signal power indicator 1.4684444), in one embodiment. Once the signal power indicator is determined, the corresponding carrier-to-noise power density ratio CN0 can be determined by searching the lookup table 800. The values of the signal power indicator and the sensitivity can vary if equation (2) or equation (3) is adopted. Such lookup table 800 can be utilized by the conversion unit 404 which is shown in FIG. 4, to determine the carrier-to-noise power density ratio CN0 of a spread spectrum signal.

In operation, the conversion unit 404 receives a signal power indicator from the signal power calculation unit 402, compares the received signal power indicator with the set of predetermined signal power indicators, looks up a predetermined signal power indicator that is closest to the received signal power indicator, and provides the carrier-to-noise power density ratio CN0 according to a predetermined carrier-to-noise power density ratio CN0 that corresponds to the closest predetermined signal power indicator, in one embodiment.

Advantageously, once the signal power indicator is calculated, the corresponding carrier-to-noise power density ratio CN0 can be determined through the lookup table 800. The required hardware resources for the conventional noise processing unit can also be reduced/avoided since the lookup table 800 pre-stored in the conversion unit 404 is obtained by computer simulation, in one embodiment. These advantages can result in simpler receiver architecture and less hardware resource.

In one embodiment, the lock status detector 126 shown in FIG. 2 and the signal power calculation unit 402 shown in FIG. 5 can be implemented by two separate modules. In another embodiment, some components of the lock status detector 126 (e.g., the first accumulator 202, the first calculation unit 204, the second calculation unit 206, the second accumulator 208, the low-pass filter (LPF) 210-1, the LPF 210-2) can be shared with the signal power calculation unit 402, in order to further save the cost and reduce the complexity of the system.

Figure 9:
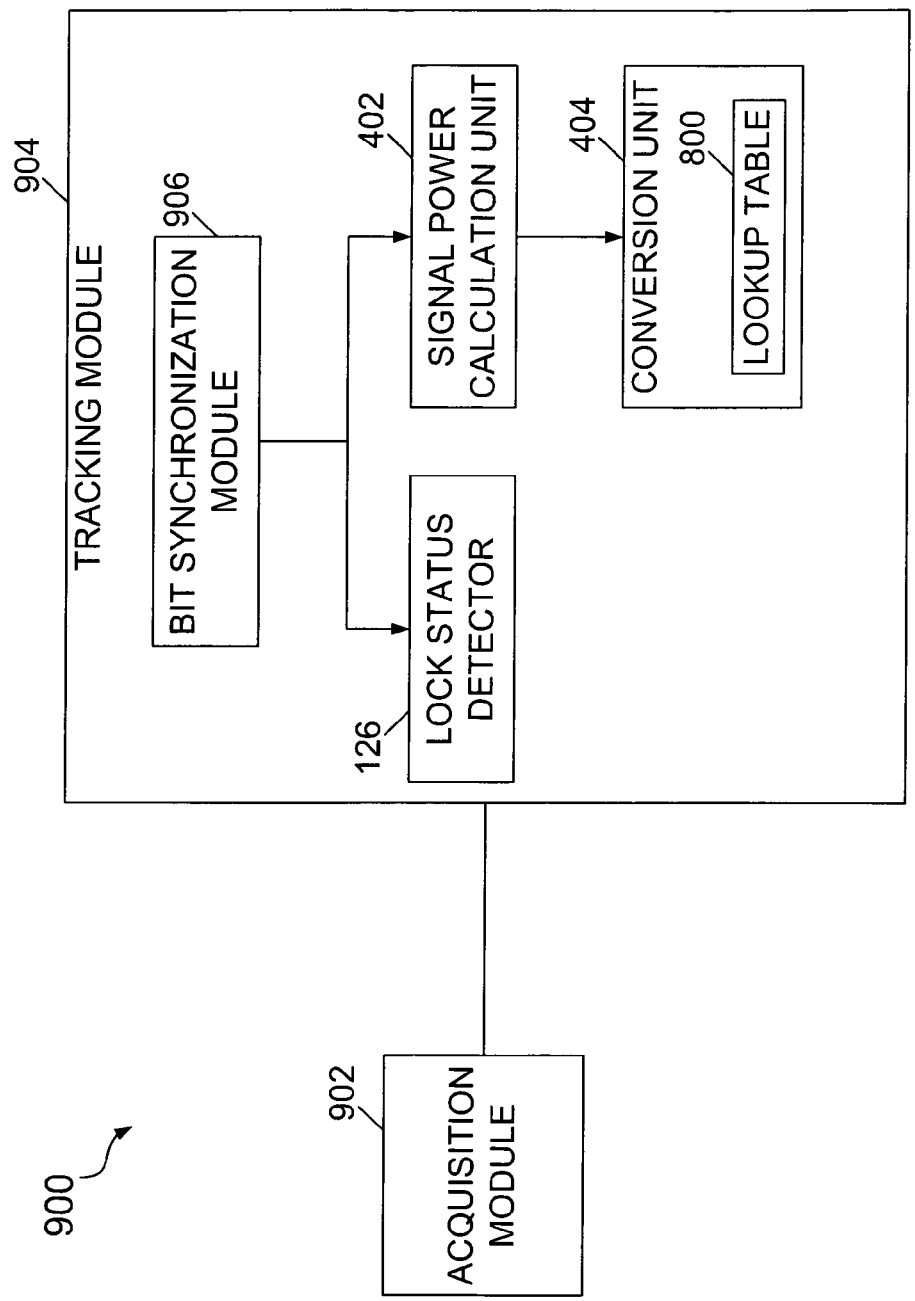
FIG. 9 illustrates a spread spectrum signal receiver for processing a spread spectrum signal, according to one embodiment of the present invention.

FIG. 9 illustrates a spread spectrum signal receiver 900 for processing a spread spectrum signal (e.g., a GPS signal), according to one embodiment of the present invention. Elements labeled the same as in FIG. 1 and FIG. 4 have similar functions and will not be repetitively described herein.

The spread spectrum signal receiver 900 includes an acquisition module 902 and a tracking module 904. The acquisition module 902 can acquire a spread spectrum signal and determine an initial carrier frequency of an in-phase carrier signal and a quadrature carrier signal (e.g., the in-phase carrier signal 104 and the quadrature carrier signal 106) in FIG. 4, and can determine a prompt PRN code (e.g., the prompt PRN code 118 in FIG. 4) associated with the spread spectrum signal. The tracking module 904 which is coupled to the acquisition module 902 can receive the information from the acquisition module 902, track the acquired spread spectrum signal, determine a lock status of the spread spectrum signal, and calculate a carrier-to-noise power density ratio CN0 of the spread spectrum signal.

The tracking module 904 includes a bit synchronization module 906 for determining the boundaries of the navigation data bit, a lock status detector 126 for determining a lock status of the spread spectrum signal, a signal power calculation unit 402 for calculating a signal power indicator of the spread spectrum signal, and a conversion unit 404 for converting the signal power indicator to a carrier-to-noise power density ratio CN0 of the spread spectrum signal according to a lookup table, e.g., the lookup table 800, in one embodiment. The lookup table 800 stores a set of predetermined carrier-to-noise power density ratios and a set of predetermined signal power indicators, in one embodiment. Each predetermined signal power indicator corresponds to a corresponding predetermined carrier-to-noise power density ratio CN0, and vice versa.

In operation, once a signal power indicator of the received spread spectrum signal is calculated by the signal power calculation unit 402, a corresponding carrier-to-noise power density ratio CN0 of the spread spectrum signal can be determined by searching the lookup table 800.

Figure 10:
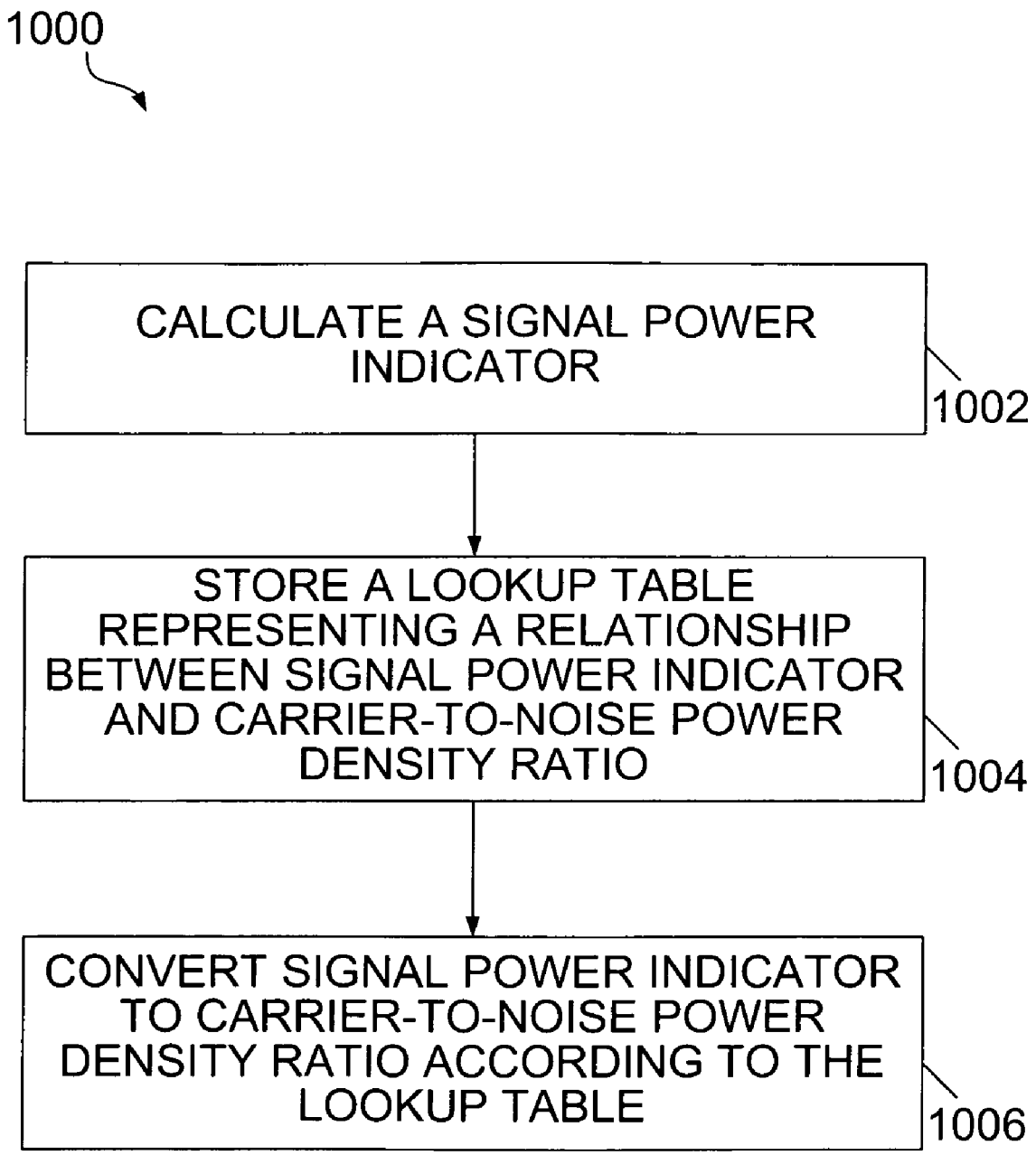
FIG. 10 illustrates a flowchart of a method for calculating a carrier-to-noise power density ratio of a spread spectrum signal, according to one embodiment of the present invention.

FIG. 10 illustrates a flowchart 1000 of a method to calculating a carrier-to-noise power density ratio of a spread spectrum signal, according to one embodiment of the present invention. FIG. 10 is described in combination with FIG. 4, FIG. 5, FIG. 6, FIG. 7 and FIG. 8.

In block 1002, a signal power indicator indicative of a signal to noise ratio of the spread spectrum signal is calculated and received.

In block 1004, a lookup table, e.g., the lookup table 800, representing a relationship between the signal power indicator and the carrier-to-noise power density ratio is stored, e.g., in the conversion unit 404, in advance. The lookup table 800 which is acquired by simulation, contains a plurality of predetermined carrier-to-noise power density ratios CN0 and a plurality of predetermined signal power indicators. Each predetermined signal power indicator corresponds to a corresponding predetermined carrier-to-noise power density ratio CN0, and vice versa.

In block 1006, the received signal power indicator is converted to the carrier-to-noise power density ratio CN0 according to the lookup table 800. In one embodiment, the received signal power indicator is compared with the plurality of predetermined signal power indicators, and a predetermined signal power indicator which is closest to the received signal power indicator is selected from the plurality of predetermined signal power indicators. Then the carrier-to-noise power density ratio CN0 according to a predetermined carrier-to-noise power density ratio corresponding to the selected predetermined signal power indicator is provided.

Accordingly, in one embodiment, the carrier-to-noise power density ratio CN0 of a spread spectrum signal, e. g., a GPS signal can be calculated by calculating a signal power indicator and converting the signal power indicator to the carrier-to-noise power density ratio CN0 by a lookup table. Advantageously, since the lookup table is obtained by computer simulation, extra hardware for the noise calculation can be reduced, in one embodiment.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims.

Other modifications, variations, and alternatives are also possible. Accordingly, the claims are intended to cover all such equivalents.

What is claimed is:

1. An apparatus for determining a carrier-to-noise power density ratio (CN0) of a spread spectrum signal, comprising:
a signal power calculation unit for determining a signal power indicator indicative of a signal to noise ratio of said spread spectrum signal; and
a conversion unit coupled to said signal power calculation unit for storing a lookup table representing a relationship between said signal power indicator and said carrier-to-noise power density ratio and for converting said signal power indicator to said carrier-to-noise power density ratio according to said lookup table,
wherein said signal power calculation unit comprises:
a first accumulator for accumulating an in-phase integration result and a quadrature integration result separately over a time period and for generating an accumulated in-phase integration result and an accumulated quadrature integration result respectively;
a first calculation unit coupled to said first accumulator for determining a first evaluation value based on said accumulated in-phase integration result and said accumulated quadrature integration result;
a second calculation unit for processing said in-phase integration result and said quadrature integration result;
a second accumulator coupled to said second calculation unit for determining a second evaluation value by accumulating an output of said second calculation unit over said time period; and
a division unit coupled to said first calculation unit and said second accumulator for determining said signal power indicator based on said first and second evaluation results.

2. The apparatus of claim 1, wherein said lookup table stores a plurality of predetermined carrier-to-noise power density ratios and a plurality of predetermined signal power indicators, and wherein each predetermined signal power indicator of said plurality of predetermined power indicators corresponds to a corresponding predetermined carrier-to-noise power density ratio of said plurality of predetermined carrier-to-noise power density ratios, and vice versa.

3. The apparatus of claim 1, wherein said in-phase integration result is obtained by integrating a pseudorandom noise (PRN) code with a first data stream which is generated by multiplying said spread spectrum signal with an in-phase signal, and wherein said quadrature integration result is obtained by integrating said PRN code with a second data stream which is generated by multiplying said spread spectrum signal with a quadrature signal.

4. The apparatus of claim 1, further comprising:
a lock status detector for receiving said in-phase integration result and said quadrature integration result and for detecting a lock status of said spread spectrum signal,
wherein said lock status detector comprises said first accumulator, said first calculation unit, said second calculation unit, and said second accumulator.

5. The apparatus of claim 1, wherein said first calculation unit calculates a first summation of a square of said accumulated in-phase integration result and a square of said accumulated quadrature integration result, and wherein said second calculation unit calculates a second summation of a square of said in-phase integration result and a square of said quadrature integration result.

6. The apparatus of claim 1, wherein said first calculation unit first calculates a first summation of a square of said accumulated in-phase integration result and a square of said accumulated quadrature integration result, and then calculates a square root of said first summation, and wherein said second calculation unit first calculates a second summation of a square of said in-phase integration result and a square of said quadrature integration result, and then calculates a square root of said second summation.

7. The apparatus of claim 1, wherein said first calculation unit calculates a first summation of an absolute value of said accumulated in-phase integration result and an absolute value of said accumulated quadrature integration result, and wherein said second calculation unit calculates a second summation of an absolute value of said in-phase integration result and an absolute value of said quadrature integration result.

8. The apparatus of claim 1, further comprising:
a first filter coupled between said first calculation unit and said division unit for filtering said first evaluation value; and
a second filter coupled between said second accumulator and said division unit for filtering said second evaluation value.

9. The apparatus of claim 1, wherein said time period is equal to a period of a navigation data bit.

10. A system for processing a spread spectrum signal, comprising:
an acquisition module for acquiring said spread spectrum signal; and
a tracking module coupled to said acquisition module for receiving information from said acquisition module and for tracking said spread spectrum signal, said tracking module comprising:
a lock status detector for detecting a lock status of said spread spectrum signal; and
an apparatus for determining a carrier-to-noise power density ratio (CN0) of said spread spectrum signal, said apparatus comprising:
a signal power calculation unit for determining a signal power indicator indicative of a signal to noise ratio of said spread spectrum signal; and
a conversion unit coupled to said signal power calculation unit for storing a lookup table representing a relationship between said signal power indicator and said carrier-to-noise power density ratio and for converting said signal power indicator to said carrier-to-noise power density ratio according to said lookup table,
wherein said signal power calculation unit comprises:
a first accumulator for accumulating an in-phase integration result and a quadrature integration result separately over a time period and for generating an accumulated in-phase integration result and an accumulated quadrature integration result respectively;
a first calculation unit coupled to said first accumulator for determining a first evaluation value based on said accumulated in-phase integration result and said accumulated quadrature integration result;
a second calculation unit for processing said in-phase integration result and said quadrature integration result;
a second accumulator coupled to said second calculation unit for determining a second evaluation value by accumulating an output of said second calculation unit over said time period; and a division unit coupled to said first calculation unit and said second accumulator for determining said signal power indicator based on said first and second evaluation results.

11. The system of claim 10, wherein said lookup table stores a plurality of predetermined carrier-to-noise power density ratios and a plurality of predetermined signal power indicators, and wherein each predetermined signal power indicator of said plurality of predetermined power indicators corresponds to a corresponding predetermined carrier-to-noise power density ratio of said plurality of predetermined carrier-to-noise power density ratios, and vice versa.

12. The system of claim 10, wherein said acquisition module determines a pseudorandom noise (PRN) code and determines an initial carrier frequency of an in-phase signal and a quadrature signal.

13. The system of claim 12, wherein said in-phase integration result is generated by integrating said PRN code with a first data stream which is obtained by multiplying said spread spectrum signal with said in-phase signal, and wherein said quadrature integration result is obtained by integrating said PRN code with a second data stream which is generated by multiplying said spread spectrum signal with said quadrature signal.

14. The system of claim 13, wherein said lock status detector receives said in-phase integration result and said quadrature integration result, and wherein said lock status detector comprises said first accumulator, said first calculation unit, said second calculation unit, and said second accumulator.

15. The system of claim 10, wherein said first calculation unit calculates a first summation of a square of said accumulated in-phase integration result and a square of said accumulated quadrature integration result, and wherein said second calculation unit calculates a second summation of a square of said in-phase integration result and a square of said quadrature integration result.

16. The system of claim 10, wherein said first calculation unit first calculates a first summation of a square of said accumulated in-phase integration result and a square of said accumulated quadrature integration result, and then calculates a square root of said first summation, and wherein said second calculation unit first calculates a second summation of a square of said in-phase integration result and a square of said quadrature integration result, and then calculates a square root of said second summation.

17. The system of claim 10, wherein said first calculation unit calculates a first summation of an absolute value of said accumulated in-phase integration result and an absolute value of said accumulated quadrature integration result, and wherein said second calculation unit calculates a second summation of an absolute value of said in-phase integration result and an absolute value of said quadrature integration result.

18. The system of claim 10, further comprising:
a first filter coupled between said first calculation unit and said division unit for filtering said first evaluation value; and
a second filter coupled between said second accumulator and said division unit for filtering said second evaluation value.

19. The system of claim 10, wherein said time period is equal to a period of a navigation data bit.

20. A method for determining a carrier-to-noise power density ratio (CN0) of a spread spectrum signal, said method comprising:
calculating a signal power indicator indicative of a signal to noise ratio of said spread spectrum signal,
storing a lookup table representing a relationship between said signal power indicator and said carrier-to-noise power density ratio; and
converting said signal power indicator to said carrier-to-noise power density ratio according to said lookup table,
wherein said calculating said signal power indicator comprises:
producing a first data stream by multiplying said spread spectrum signal with an in-phase signal;
producing a second data stream by multiplying said spread spectrum signal with a quadrature signal;
calculating a first integration result based on said first data stream and a pseudorandom noise (PRN) code, wherein said PRN code having the same phase shift as said first data stream;
calculating a second integration result based on said second data stream and said PRN code, wherein said PRN code having the same phase shift as said second data stream;
determining a first evaluation value and a second evaluation value based on said first and second integration results; and
dividing said first evaluation value by said second evaluation value to provide said signal power indicator.

21. The method of claim 20, further comprising:
storing a plurality of predetermined carrier-to-noise power density ratios and a plurality of predetermined signal power indicators in said lookup table,
wherein each predetermined signal power indicator of said plurality of predetermined power indicators corresponds to a corresponding predetermined carrier-to-noise power density ratio of said plurality of predetermined carrier-to-noise power density ratios, and vice versa.

22. The method of claim 21, further comprising:
comparing said signal power indicator with said plurality of predetermined signal power indicators;
selecting a predetermined signal power indicator which is closest to said signal power indicator from said plurality of predetermined signal power indicators; and
providing said carrier-to-noise power density ratio according to a predetermined carrier-to-noise power density ratio corresponding to said selected predetermined signal power indicator.

23. The method of claim 20, further comprising:
producing a first accumulated result and a second accumulated result by accumulating said first and second integration results respectively over a time period;
determining said first evaluation value by calculating a first summation of a square of said first accumulated result and a square of said second accumulated result;
calculating a second summation of a square of said first integration result and a square of said second integration result; and
determining said second evaluation value by accumulating said second summation over said time period.

24. The method of claim 20, further comprising:
producing a first accumulated result and a second accumulated result by accumulating said first and second integration results respectively over a time period;
calculating a first summation of a square of said first accumulated result and a square of said second accumulated result;
determining said first evaluation value by calculating a first square root of said first summation;
calculating a second summation of a square of said first integration result and a square of said second integration result;
calculating a second square root of said second summation; and
determining said second evaluation value by accumulating said second square root over said time period.

25. The method of claim 20, further comprising:
producing a first accumulated result and a second accumulated result by accumulating said first and second integration results respectively over a time period;
determining said first evaluation value by calculating a first summation of an absolute value of said first accumulated result and an absolute value of said second accumulated result;
calculating a second summation of an absolute value of said first integration result and an absolute value of said second integration result; and
determining said second evaluation value by accumulating said second summation over said time period.

* * * * *